(12) United States Patent
Sugihara (10) Patent No.: US 6,249,322 B1
(45) Date of Patent: Jun. 19, 2001

(54) TV RECEIVER, METHOD OF SETTING RECEPTION CHANNEL, AND PICTURE DISPLAY METHOD

(75) Inventor: Masakazu Sugihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/077,580

(22) PCT Filed: Oct. 1, 1997

(86) PCT No.: PCT/JP97/03498

§ 371 Date: Jun. 1, 1998

§ 102(e) Date: Jun. 1, 1998

(87) PCT Pub. No.: WO98/15118

PCT Pub. Date: Apr. 9, 1998

(30) Foreign Application Priority Data

Oct. 2, 1996 (JP) ...................................... 8-281469

(51) Int. Cl.⁷ ............................ H04N 5/44; H04N 5/445; H04N 3/24; H04N 5/50
(52) U.S. Cl. ...................... 348/634; 348/553; 348/563; 348/564; 348/731; 348/734; 348/633
(58) Field of Search ..................... 348/553, 563, 348/564, 565, 569, 576, 725, 731, 732, 734, 738, 632, 633, 634; H04N 5/45, 5/46

(56) References Cited

U.S. PATENT DOCUMENTS

| | | | |
|---|---|---|---|
| 4,328,517 | * 5/1982 | Watanabe | 358/191.1 |
| 5,299,010 | * 3/1994 | Nakazawa et al. | 348/731 |
| 5,471,251 | * 11/1995 | Inaba et al. | 348/634 |
| 5,528,304 | * 6/1996 | Cherrick et al. | 348/565 |
| 5,708,475 | * 1/1998 | Hayashi et al. | 348/468 |
| 5,734,436 | * 3/1998 | Abe et al. | 348/564 |
| 5,754,253 | * 5/1998 | Lee | 348/565 |
| 5,831,591 | * 11/1998 | Suh | 348/115 |
| 5,969,769 | * 10/1999 | Hamadate | 348/568 |

* cited by examiner

Primary Examiner—Reinhard J. Eisenzopf
Assistant Examiner—Paulos Natnael
(74) Attorney, Agent, or Firm—Frommer Lawrence & Haug, LLP.; William S. Frommer; Joe H. Shallenburger (57) ABSTRACT

When an automatic programming process for searching receivable channels and presetting the receivable channels is executed or when an automatic erasing/adding process for adding or erasing a set channel is executed, a video signal of a master picture plane is muted by a muting circuit 20. A source selector switch 12 is switched so as to display a picture plane of the reception channel onto a slave picture plane. When the automatic programming process or automatic erasing/adding process is executed, since the video signal of the master picture plane is muted, a display signal is generated by a horizontal pulse and a vertical pulse in a free-run state. Thus, the display is stabilized. Even during the execution of the automatic program or automatic erasing/adding process, the video image of the channel which is being received can be confirmed by the slave picture plane.

6 Claims, 10 Drawing Sheets

TV RECEIVER, METHOD OF SETTING RECEPTION CHANNEL, AND PICTURE DISPLAY METHOD

TECHNICAL FIELD

The invention relates to a television receiver and, more particularly, to a channel presetting of a television receiver which realizes a multi-channel.

BACKGROUND ART

In association with the spread of a CATV (Community Antenna Television) and a satellite broadcasting, the number of channels which can be set in a television receiver has been increasing. In the television receiver which can perform a multi-channel reception as mentioned above, in order to preset channels which can be received, an automatic programming process is executed when a television set is purchased.

When the automatic programming process is executed, the channels are scanned, whether a reception signal can be obtained or not is determined on each channel, and the receivable channels are preset. By performing a channel search and presetting the receivable channels as mentioned above, after the channels were preset, the channels are switched to only the preset channels. Even in case of a television receiver which can perform the multi-channel reception, the channel selection can be easily performed.

As mentioned above, in the automatic programming process, the channels are scanned and whether the reception signal is obtained or not is determined on each channel. Therefore, there is a case where the receiver is temporarily set to a channel having no signal.

However, when the receiver is temporarily set to a channel having no signal, a problem that a display on the screen is disturbed occurs.

That is, a display generating circuit to perform the screen display generates a display signal on the basis of a sync signal extracted from the reception signal. Therefore, when the receiver is temporarily set to a channel having no signal during the execution of the automatic programming process, a disturbance occurs in the sync signal and the screen display is disturbed.

Particularly, when a some signal exists at the same frequency as that of the set channel, this signal is received and there is a case where such a channel is erroneously preset as a channel having the signal by the automatic programming process.

In such a case, the preset of the erroneous channel can be erased by a channel erasing/adding process after that. However, when the receiver is set to the channel having no signal, the screen display by the channel erasing/adding process is disturbed, the display of the set channels cannot be known, and the erase of the preset cannot be easily performed.

To prevent such a situation, when the automatic programming process is executed, a method of muting a video signal and performing a screen display on a muting picture plane is considered. By muting the video signal as mentioned above, since the disturbance of the sync signal is eliminated, the disturbance of the display is eliminated.

However, when the video signal is muted, a video image of the received channel can not be seen during the execution of the automatic programming process and the channels to be preset cannot be confirmed.

It is, therefore, an object of the invention to provide a television receiver, a method of setting a reception channel, and an image display method, in which during the execution of an automatic programing process such that channels are sequentially scanned to thereby determined whether they can be received or not and the numbers of the channels which can be received are set, a disturbance of the screen display is eliminated and, even during the execution of the automatic programing process, a received picture plane can be confirmed.

Another object of the invention is to provide a television receiver, a method of setting a reception channel, and an image display method, in which during the execution of a channel erasing/adding process such as to add or erase a channel number, a disturbance of the screen display is eliminated and, even during the execution of the channel erasing/adding process, a received picture plane can be confirmed.

DISCLOSURE OF THE INVENTION

According to the invention, there is provided a television receiver which can preset a channel which can be received, having: reception channel selecting means for selecting a reception channel; detecting means for detecting whether a video signal can be obtained in the reception channel selected by the reception channel selecting means or not and outputting a detection result; reception channel storing means in which the reception channel is stored; and control means for allowing the reception channel selecting means to sequentially scan a plurality of reception channels and allowing receivable reception channels to be stored in the reception channel storing means on the basis of the detection result in each reception channel, characterized in that the television receiver comprises: image display means for displaying an image corresponding to a video signal onto a screen; video signal processing means for displaying at least two video images onto the picture plane on the basis of at least a first video signal corresponding to the channel selected by the reception channel selecting means and a certain second video signal; and switching means for switching the second video signal to be displayed into a second portion on the screen to the first video signal to be displayed into a first portion on the screen and displaying an image based on the first video signal into the second portion on the screen, and the switching means is switched when at least the receivable channel is preset, thereby allowing the image based on the first video signal to be displayed into the second portion on the screen.

According to the invention, there is provided a television receiver which can set a channel which can be received, having: reception channel selecting means for performing a selection of a reception channel; reception channel storing means in which a receivable channel is stored; input means for inputting a desired reception channel; and control means for controlling so that the channel inputted from the input means is stored or erased into/from the reception channel storing means, wherein the television receiver comprises: image display means for displaying an image based on a video signal onto a screen; and video signal processing means for displaying at least two video images based on a first video signal and a second video signal into a first portion and a second portion on the screen, respectively, and when the receivable channel is set, the video signal processing means displays a video image based on a video signal of the channel inputted from the input means into the second portion, and the control means allows the channel inputted from the input means to be stored or erased into/from the reception channel storing means, thereby setting the reception channel.

According to the invention, there is provided a method of setting a reception channel for presetting a channel which can be received into a television receiver, having the steps of: allowing reception channel selecting means to sequentially scan a plurality of reception channels; and detecting whether a video signal is obtained in the reception channel selected by the reception channel selecting means or not and outputting a detection result, characterized in that the method comprises the steps of: storing the receivable reception channel into reception channel storing means on the basis of the detection result in each reception channel; displaying at least two video images onto a screen on the basis of at least a first video signal corresponding to the channel selected by the reception channel selecting means and a certain second video signal; and switching the second video signal to be displayed into a second portion on the screen to the first video signal to be displayed into a first portion on the screen when the receivable channel is preset, thereby displaying an image based on the first video signal into the second portion on the screen.

According to the invention, there is provided a method of setting a reception channel for presetting a channel which can be received into a television receiver, having the step of storing or erasing a desired reception channel into/from reception channel storing means, characterized by comprising: an input step of inputting the desired reception channel; a reception channel tuning step of tuning the reception channel; a video signal processing step of displaying at least two video images based on a first video signal of the reception channel and a certain second video signal into a first portion and a second portion on a screen, respectively; a step of displaying the video image based on the video signal of the reception channel into the second portion when the receivable channel is set; and a step of storing or erasing the channel inputted in the input step into/from the reception channel storing means, thereby setting the reception channel.

According to the invention, there is provided a television receiver having: reception channel tuning means for tuning a reception channel; input means for inputting a desired reception channel to be tuned; and control means for allowing the reception channel tuning means to tune the reception channel on the basis of the reception channel inputted by the input means, characterized in that the television receiver comprises: image display means for displaying an image corresponding to a video signal onto a screen; video signal processing means for displaying a video signal corresponding to the channel tuned by the reception channel tuning means onto the screen; display signal forming means for forming a display signal to display various information onto the screen and displaying an image corresponding to the display signal onto the screen; signal oscillating means for generating a signal at a predetermined frequency; sync signal extracting means for extracting a sync signal from the video signal; internal sync signal forming means for forming an internal sync signal on the basis of the sync signal and the signal oscillating means and supplying to the display signal forming means; and muting means for shutting off the video signal in order to form a muting picture plane onto the screen, and when the video signal is shut off by the muting means, the internal sync signal forming means is allowed to form the internal sync signal on the basis of the signal oscillating means, and the image corresponding to the display signal is displayed onto the screen by the display signal forming means on the basis of the sync signal.

According to the invention, there is provided an image display method of displaying an image corresponding to a display signal into a television receiver, having: an input step of inputting a desired reception channel to be tuned; a reception channel tuning step of tuning the desired reception channel by tuning means; and a display signal forming step of forming a display signal to display various information onto a screen, thereby displaying an image corresponding to the display signal onto the screen, characterized by comprising: an image display step of displaying an image corresponding to the video signal tuned by the tuning means onto the screen; a signal oscillating step of generating a signal at a predetermined frequency; a sync signal extracting step of extracting a sync signal from the video signal; an internal sync signal forming step of forming an internal sync signal on the basis of the sync signal and the signal oscillating step; a muting step of shutting off the video signal in order to form a muting picture plane onto the screen; and a step of allowing the internal sync signal to be formed on the basis of the signal by the signal oscillating step when the video signal is shut off by the muting step, thereby displaying the image corresponding to the display signal onto the screen on the basis of the sync signal.

According to the invention, when the automatic programming process for searching the channel which can be received and presetting the receivable channel is executed, the video signal of a master picture plane is muted and a picture plane of the reception channel is displayed on a slave picture plane. When the automatic programming process is performed, since the video signal of the master picture plane has been muted, a disturbance of the sync signal is eliminated and the display is stabilized. Even during the execution of the automatic programing, the video image of the channel which is being received can be confirmed by the slave picture plane.

When the channel erasing/adding programming process for adding or erasing a channel is executed, the video signal of the master picture plane is muted and the picture plane of the reception channel is displayed on the slave picture plane. Therefore, for a period of time of the channel erasing/adding programming process, the display is stabilized. Even during the execution of the channel erasing/adding program, the video image of the channel which is being received can be confirmed by the slave picture plane.

BEST MODE FOR CARRYING OUT THE INVENTION

Figure 1:
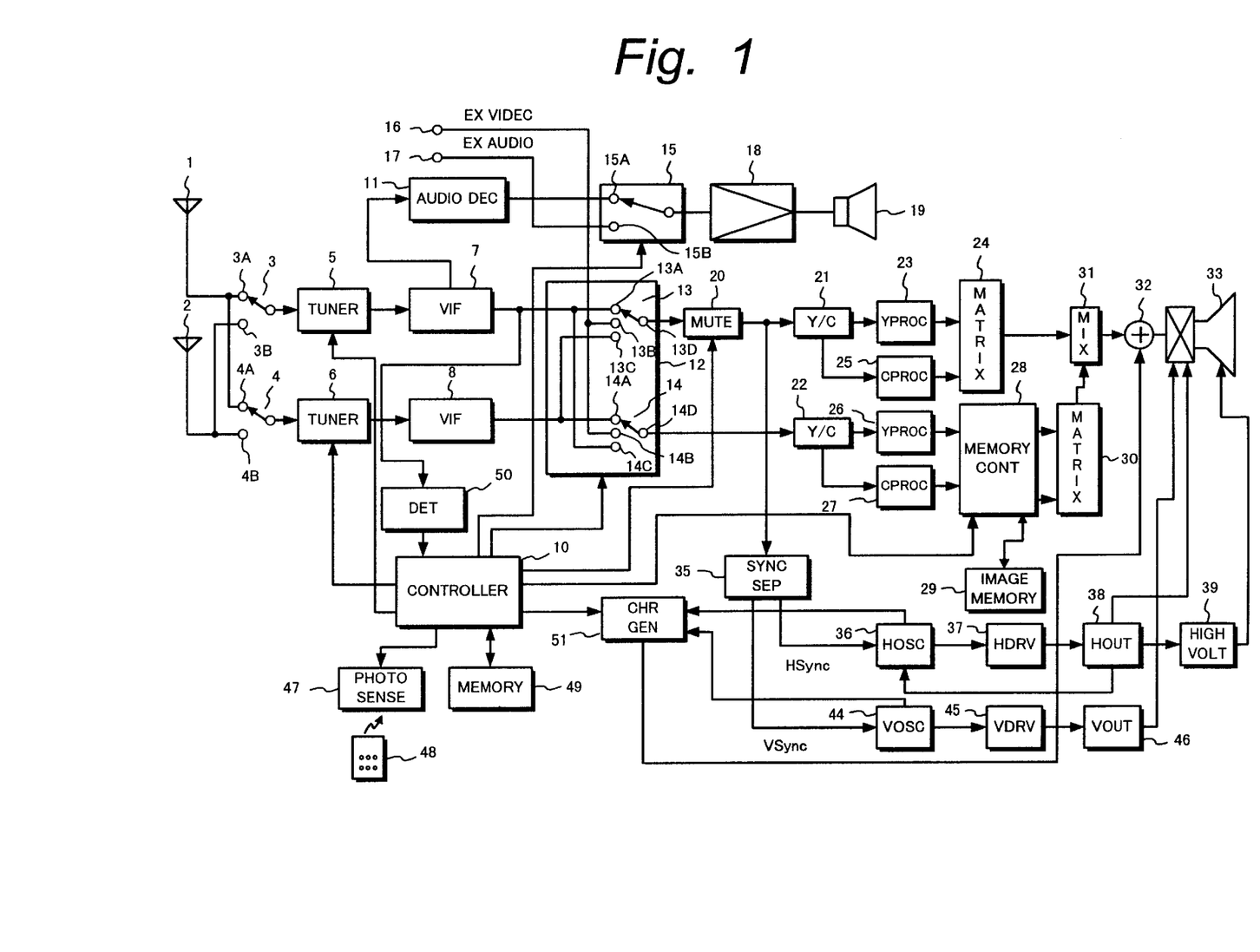
FIG. 1 is a block diagram of an example of a television receiver to which the invention is applied.

An embodiment of the invention will now be described hereinbelow with reference to the drawings. FIG. 1 shows an example of a television receiver to which the invention is applied. In the television receiver to which the invention is applied, what is called a PinP (Picture in Picture) in which a slave picture plane is displayed into a master picture plane can be set.

In FIG. 1, reference numerals 1 and 2 denote antennas. A signal from a television broadcasting station is received by the antennas 1 and 2. The reception signal from the antenna 1 is supplied to a terminal 3A of an antenna switch 3 and is also supplied to a terminal 4A of an antenna switch 4. The reception signal from the antenna 2 is supplied to an input terminal 3B of the antenna switch 3 and is also supplied to an input terminal 4B of the antenna switch 4. An output of the antenna switch 3 is supplied to a tuner circuit 5. An output of the antenna switch 4 is supplied to a tuner circuit 6.

The antenna switch 3 switches the signal which is inputted to the tuner circuit 5 between the reception signal from the antenna 1 and the reception signal from the antenna 2. When the antenna switch 3 has been set to the terminal 3A side, the reception signal from the antenna 1 is supplied to the tuner circuit 5 through the antenna switch 3. When the antenna switch 3 has been set to the terminal 3B side, the reception signal from the antenna 2 is supplied to the tuner circuit 5 through the antenna switch 3.

The antenna switch 4 switches the signal which is inputted to the tuner circuit 6 between the reception signal from the antenna 1 and the reception signal from the antenna 2. When the switching circuit 4 has been set to the terminal 4A side, the reception signal from the antenna 1 is supplied to the tuner circuit 6 through the switching circuit 4. When the switching circuit 4 has been set to the terminal 4B side, the reception signal from the antenna 2 is supplied to the tuner circuit 6 through the antenna switch 4.

The tuner circuit 5 is a main tuner circuit for the master picture plane. A desired reception channel to be displayed into the master picture plane is selected by the tuner circuit 5. The reception signal is converted to an intermediate frequency signal and is supplied to an intermediate frequency and video detecting circuit 7.

The tuner circuit 6 is a sub tuner circuit for the slave picture plane. A desired reception channel to be displayed into the slave picture plane is selected by the tuner circuit 6. The reception signal is converted to an intermediate frequency signal and is supplied to an intermediate frequency and video detecting circuit 8.

Channel set signals are supplied from a controller 10 to the tuner circuits 5 and 6. Channels in the tuner circuits 5 and 6 are set by the tuner set signals. Information regarding the channels has been stored in a memory 49.

As mentioned above, in the television receiver to which the invention is applied, two tuner circuits of the main tuner circuit 5 and sub tuner circuit 6 are provided and the different channels can be set in the master picture plane and slave picture plane by the tuner circuits 5 and 6.

The intermediate frequency signal from the main tuner circuit 5 for the master picture plane is amplified and a video signal is detected by the intermediate frequency and video detecting circuit 7. Thus, a composite color video signal of, for example, the NTSC system to form the master picture plane is demodulated. The composite color video signal is supplied to a terminal 13A of a switching circuit 13 of a video source selector switch 12 and is also supplied to a terminal 14C of a switching circuit 14.

The intermediate frequency signal from the sub tuner circuit 6 for the slave picture plane is amplified and a video signal is detected by the intermediate frequency and video detecting circuit 8. Thus, a composite color video signal of, for example, the NTSC system to form the slave picture plane is demodulated. The composite color video signal is supplied to a terminal 14A of the switching circuit 14 of the video source selector switch 12 and is also supplied to a terminal 13C of the switching circuit 13.

An audio intermediate frequency signal is extracted from a beat component of, for example, 4.5 MHz by the intermediate frequency and video detecting circuit 7. The audio intermediate frequency signal is supplied to an audio decoder 11. An audio signal is demodulated by the audio decoder 11. The audio signal from the audio decoder 11 is supplied to a terminal 15A of an audio source selector switch 15.

In the television receiver to which the invention is applied, as will be explained in detail hereinlater, the automatic programming process can be performed. When the automatic programming process is executed, the channels are scanned and whether a reception signal can be obtained or not is determined on each channel. When the signal is received, the relevant channel is preset as a receivable channel.

To execute such an automatic programming process, an output of the intermediate frequency and video detecting circuit 7 is supplied to a signal detecting circuit 50. Whether the reception signal is obtained or not is determined by the signal detecting circuit 50. An output of the signal detecting circuit 50 is supplied to the controller 10.

In the television receiver to which the invention is applied, an external video input terminal 16 and an external audio input terminal 17 are provided. A composite color video signal from the outside is supplied to the external video input terminal 16. An audio signal from the outside is supplied to the external audio input terminal 17.

The video signal from the external video input terminal 16 is supplied to a terminal 13B of the switching circuit 13 of the source selector switch 12 and is also supplied to a terminal 14B of the switching circuit 14. The audio signal from the external audio input terminal 17 is supplied to a terminal 15B of the audio source selector switch 15.

The video source selector switch 12 switches the video sources on the basis of a switch control signal from the controller 10. The video source selector switch 12 has the switching circuit 13 to select the video signal to be displayed on the master picture plane and the switching circuit 14 to select the video signal to be displayed on the slave picture plane.

The video signal to be displayed on the master picture plane is outputted from an output terminal 13D of the switching circuit 13 of the video source selector switch 12. The video signal to be displayed on the slave picture plane is outputted from an output terminal 14D of the switching circuit 14.

In the case where the picture plane based on the video signal of the channel set by the main tuner circuit 5 is displayed on the master picture plane, the switching circuit 13 of the video source selector switch 12 is switched to the terminal 13A side. In the case where the picture plane based on the video signal from the external video input terminal 16 is displayed on the master picture plane, the switching circuit 13 is switched to the terminal 13B side. In the case where the picture plane based on the video signal of the channel set by the sub tuner circuit 6 is displayed on the master picture plane, the switching circuit 13 is switched to the terminal 13C side.

In the case where the picture plane based on the video signal of the channel set by the sub tuner circuit 6 is displayed on the slave picture plane, the switching circuit 14 of the video source selector switch 12 is switched to the terminal 14A side. In the case where the picture plane based on the video signal from the external video input terminal 16 is displayed on the slave picture plane, the switching circuit 14 is switched to the terminal 14B side. In the case where the picture plane based on the video signal of the channel set by the main tuner circuit 5 is displayed on the slave picture plane, the switching circuit 14 is switched to the terminal 14C side.

The audio source selector switch 15 switches the audio sources on the basis of a switch control signal from the controller 10. An output of the audio source selector switch 15 is supplied to an audio amplifier 18. An output of the audio amplifier 18 is supplied to a speaker 19.

In the case where the audio sound based on the audio signal of the channel set by the main tuner circuit 5 is outputted, the audio selector switch 15 is switched to the terminal 15A side. In the case where audio sound based on the audio signal from the external audio input terminal 17 is outputted, the switch 15 is switched to the terminal 15B side.

The video signal of the master picture plane which is outputted from the output terminal 13D of the switching circuit 13 of the video source selector switch 12 is supplied to a Y/C separating circuit 21 through a muting circuit 20. The video signal of the slave picture plane which is outputted from the output terminal 14D of the switching circuit 14 is supplied to a Y/C separating circuit 22.

The Y/C separating circuit 21, a luminance signal processing circuit 23, a chroma signal processing circuit 25, and a matrix circuit 24 form three primary color signals R, G, and B to be displayed on the master picture plane.

That is, the video signal of the master picture plane is separated into a luminance signal Y and a chroma signal C by the Y/C separating circuit 21. The luminance signal Y from the Y/C separating circuit 21 is supplied to the luminance signal processing circuit 23. Picture quality adjustments such as luminance adjustment and brightness adjustment and the like are executed in the luminance signal processing circuit 23.

The chroma signal C from the Y/C separating circuit 21 is supplied to the chroma signal processing circuit 25. A burst signal is extracted from the reception signal by the chroma signal processing circuit 25. Color difference signals I and Q are demodulated by using the burst signal. An ACC (Automatic Color Control), a correction of frequency characteristics, and the like are executed in the chroma signal processing circuit 25.

The luminance signal Y from the luminance signal processing circuit 23 and the color difference signals I and Q from the chroma signal processing circuit 25 are supplied to the matrix circuit 24. The three primary color signals R, G, and B for the master picture plane are formed from the luminance signal Y and color difference signals I and Q by the matrix circuit 24.

The Y/C separating circuit 22, a luminance signal processing circuit 26, a chroma signal processing circuit 27, a memory controller 28, an image memory 29, and a matrix circuit 30 are used to form the slave picture plane and are called a PinP circuit.

That is, the video signal of the slave picture plane is separated into the luminance signal Y and chroma signal C by the Y/C separating circuit 22. The luminance signal Y from the Y/C separating circuit 22 is supplied to the luminance signal processing circuit 26. The chroma signal C is supplied to the chroma signal processing circuit 27. A burst signal is extracted from the reception signal by the chroma signal processing circuit 27. The color difference signals I and Q are demodulated by using the burst signal.

The luminance signal Y from the luminance signal processing circuit 26 and the color difference signals I and Q from the chroma signal processing circuit 27 are stored in the image memory 29 under the control of the memory controller 28. By the control of the memory controller 28, the image signal stored in the image memory 29 is subjected to, for example, a decimating process and is read out, thereby forming the signal of a small picture plane to be displayed on the slave picture plane. The signal of the small picture plane is supplied to a matrix circuit 30. The three primary color signals R, G, and B for the slave picture plane are formed from the luminance signal Y and color difference signals I and Q by the matrix circuit 30.

The number of slave picture planes is not limited to 1. By providing a plurality of image memories, a plurality of picture planes can be also divisionally displayed on the master picture plane.

The three primary color signals R, G, and B of the master picture plane from the matrix circuit 24 and the three primary color signals R, G, and B of the slave picture plane from the matrix circuit 30 are supplied to a mixing circuit 31. The three primary color signals R, G, and B of the master picture plane and the three primary color signals R, G, and B of the slave picture plane are synthesized by the mixing circuit 31.

An output of the mixing circuit 31 is supplied to an adding circuit 32 of a display signal. A display signal from a display generating circuit 51 is supplied to the adding circuit 32. An output of the adding circuit 32 is supplied to an image receiving tube 33.

The video signal of the master picture plane obtained through the muting circuit 20 is supplied to a sync separating circuit 35. Horizontal and vertical sync signals are extracted by the sync separating circuit 35. The horizontal sync signal extracted by the sync separating circuit 35 is supplied to a horizontal oscillating circuit 36. The vertical sync signal extracted by the sync separating circuit 35 is supplied to a vertical oscillating circuit 44.

A horizontal pulse synchronized with the horizontal sync signal from the sync separating circuit 35 is formed by the horizontal oscillating circuit 36. The horizontal pulse is supplied to a horizontal output circuit 38 through a horizontal driving circuit 37. A horizontal saw-tooth wave current is supplied to a horizontal deflecting coil of the image receiving tube 33 by the horizontal output circuit 38.

In this instance, a flyback pulse is generated in a blanking period of the saw-tooth wave. The flyback pulse is fed back to the horizontal oscillating circuit 36. The feedback pulse and an output of the horizontal oscillating circuit 36 are phase compared and an oscillating frequency is controlled on the basis of a comparison output. Thus, an AFC (Automatic Frequency Control) loop is formed and a stability of the oscillating operation of the horizontal oscillating circuit 36 is held.

The flyback pulse is stepped up and a high voltage is formed by a high voltage circuit 39. This high voltage is applied as an anode voltage or a focusing voltage to the image receiving tube 33.

A saw-tooth wave synchronized with the vertical sync signal from the sync separating circuit 35 is formed by the vertical oscillating circuit 44. An output of the vertical oscillating circuit 44 is supplied to a vertical output circuit 46 through a vertical driving circuit 45. A vertical saw-tooth wave current is supplied to a vertical deflecting coil of the image receiving tube 33 by the vertical output circuit 46.

The controller 10 controls the whole operation. An input is transferred from a remote commander 48 to the controller 10 through a photosensing circuit 47. On the basis of this input, a reception channel or the like is set. On the basis of an output of the controller 10, a display signal is generated from the display generating circuit 51.

The horizontal pulse and vertical pulse which are synchronized with the horizontal sync signal and vertical sync signal are supplied to the display generating circuit 51 from the horizontal oscillating circuit 36 and vertical oscillating circuit 37. As a horizontal pulse, the flyback pulse from the horizontal output circuit can be also used as it is. The display signal is generated by the display generating circuit 40 at timings based on the horizontal pulse and vertical pulse. The display signal is supplied to the adding circuit 32.

The display signal from the display generating circuit 51 is superimposed to the three primary color signals R, G, and B from the mixing circuit 31 by the adding circuit 32. Thus, setting states of the channel and a sound volume are displayed on the screen of the image receiving tube 33.

In the case where the muting circuit 20 executes the muting operation, no sync signal is obtained. Therefore, the horizontal oscillating circuit 36 and vertical oscillating circuit 37 are in what is called a free-run state where the oscillation is continued at a peculiar oscillating frequency. In this instance, therefore, the display signal is generated from the display generating circuit 40 at timings based on free-run outputs of the horizontal oscillating circuit 36 and vertical oscillating circuit 37. Therefore, the stable display can be performed while the muting operation is executed.

In the television receiver to which the invention is applied, the automatic programming process is executed when the set is purchased. That is, in the television receiver, a multi-channel construction is formed so that the CATV and satellite broadcasting can be covered. However, the receivable channels differ in dependence on the channel of the broadcasting station of the district where the user resides or whether the user is under contract to the CATV or satellite broadcasting or not. Therefore, if the channels are not set in accordance with the channel of the broadcasting station of the district where the user resides or whether the user is under contract to the CATV or satellite broadcasting or not, the channel setting will become troublesome.

When the automatic programming process is executed, the channels are scanned and whether the reception signal is obtained or not is discriminated every channel. When the signal is received, this channel is preset as a receivable channel.

After the automatic programming process was executed as mentioned above, for example, when the user depresses a channel set-up/down key of the remote commander 48, the channel is set-up/down to only the receivable channel. Therefore, even in case of the television receiver which can receive multi-channels, the station selection can be easily performed.

To realize such an automatic programming process, the signal detecting circuit 50 to detect whether the reception signal is obtained from the output of the main tuner circuit 5 or not and the memory 49 to store the receivable channels are provided for the television receiver to which the invention is applied.

Figure 2:
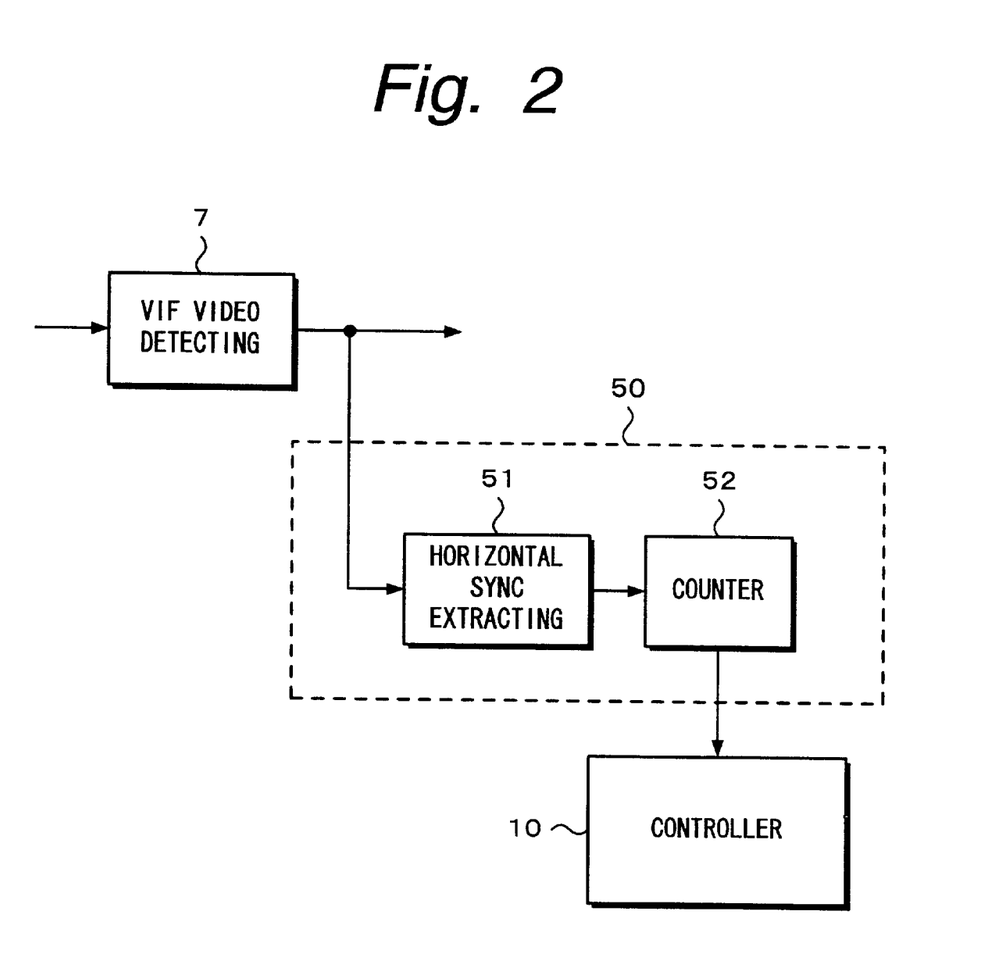
FIG. 2 is a block diagram of an example of a signal detecting circuit.

Specifically speaking, as shown in FIG. 2, the signal detecting circuit 50 can be constructed by a sync separating circuit 51 to extract the horizontal sync signal and a counter 52 to count the horizontal sync signal. The counter 52 can be realized by a counter in a microcomputer which is used as a controller 10. When the video signal is received, a predetermined number of horizontal sync signals are detected in a predetermined time. From this point, the number of horizontal sync signals for a predetermined period of time is counted by the counter 52 and, when a count value lies within a predetermined range, the presence of the signal is decided.

In the television receiver to which the invention is applied, for example, the number of horizontal sync signals is counted for two msec and when the count value for this period of time lies within a range from 16 to 62, it is determined that the video signal was detected. A result that the count value lies within a range from 16 to 62 for two msec denotes that the video signal is theoretically a signal from 8 kHz to 31 kHz. If the signal of the NTSC system has been received, the signal of the horizontal frequency (15.75 kHz) of the NTSC system ought to be received. However, an error which is caused by noises or the like is allowed and when the signal from 8 kHz to 31 kHz is received, the presence of the signal is decided.

Figure 3:
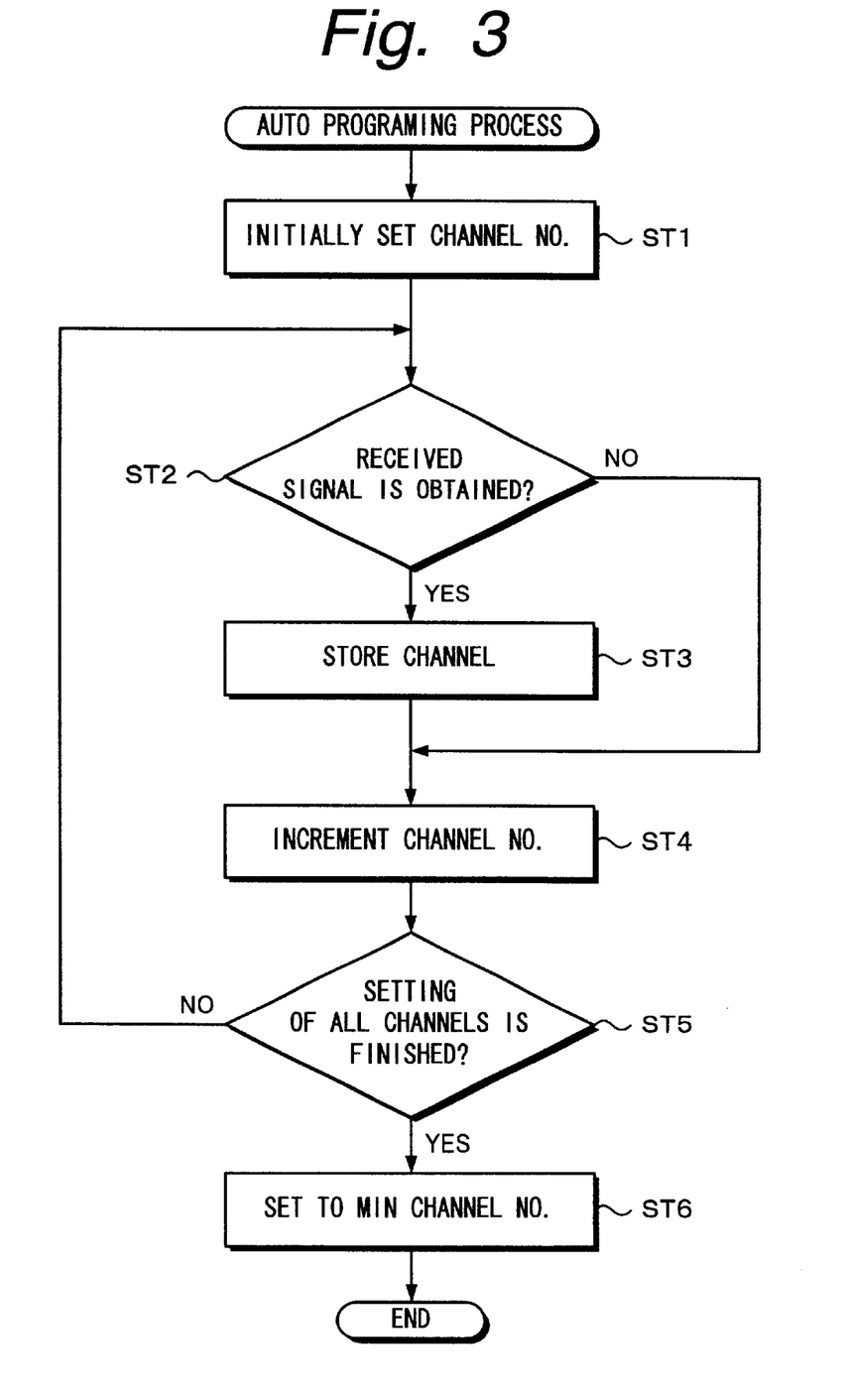
FIG. 3 is a flowchart which is used for explanation of the television receiver to which the invention is applied.

FIG. 3 is a flowchart showing an example of processes to realize the automatic program. As shown in FIG. 3, in the automatic programming process, first, the reception channel of the main tuner circuit 5 is set to an initial value n (for example, n=1) (step ST1). Whether the reception is derived in such a channel or not is discriminated by the signal detecting circuit 50 (step ST2).

If the reception signal is derived in step ST2, the channel number is stored in the memory 49 (step ST3). The channel number n is increased (step ST4). If the reception signal is not obtained in step ST2, step ST4 follows and the channel number n is increased.

A check is made to see if the setting of all channels has been finished (step ST5). If the setting of all channels is not finished yet, the processing routine is returned to step ST2. A check is made to see if the reception signal is obtained in the next channel number. If the reception signal is obtained, the channel number is stored in the memory 49 in step ST3. The channel number n is increased in step ST4.

By repeating the above processes, the receivable channels are searched with respect to all channels and the numbers of the receivable channels are stored into the memory 49.

When it is determined in step ST5 that the processes of all of the channels were finished, the channel number is set to the minimum channel number among the stored channel numbers (step ST6). The processing routine is finished.

By such an automatic programming process, the numbers of the receivable channels are stored into the memory 49.

According to such an automatic programming process, there is a case where the channel number is erroneously set to the receivable channel number due to noises or the like.

There is also a case where the user wants to preset a new channel. In order to make it possible to cope with such a case, in the television receiver to which the invention is applied, a channel erasing/adding process can be performed.

Figure 4:
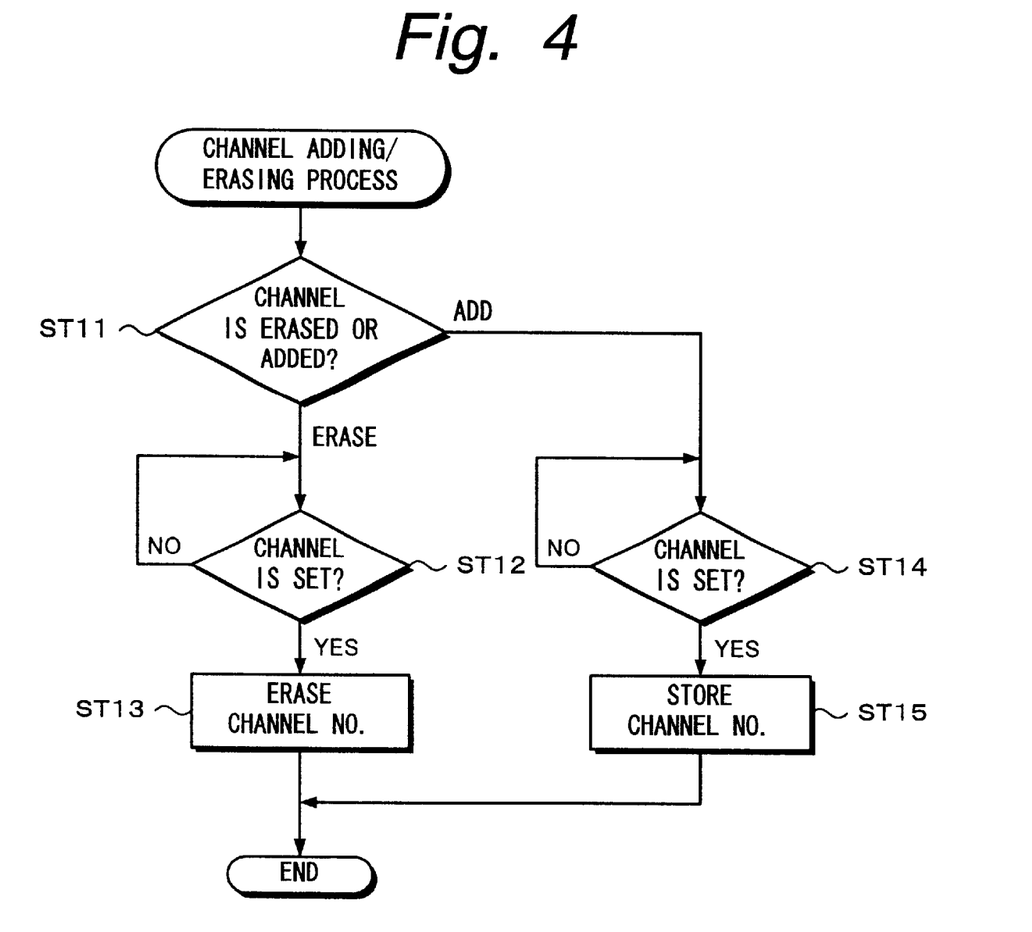
FIG. 4 is a flowchart which is used for explanation of the television receiver to which the invention is applied.

FIG. 4 is a flowchart showing an example of processes to realize the channel erasing/adding process. As shown in FIG. 4, in case of performing the channel erasing/adding process, a check is made to see if the channel is erased or added (step ST11).

When the channel is erased, whether the channel to be erased has been set or not is discriminated (step ST12). When the channel is set, this channel is erased from the memory 49 (step ST13). When the channel is added, a check is made to see if the channel to be added has been set (step ST14). When the channel is set, this channel is stored in the memory 49 (step ST15).

In the television receiver to which the invention is applied, when such an automatic programming process or a channel erasing/adding process is executed, the master picture plane is muted and the picture plane which is being received is displayed on the slave picture plane by PinP. Therefore, the picture plane is not disturbed and the receiving state can be confirmed.

That is, when the muting circuit 20 in FIG. 1 is operated and the master picture plane is muted, no sync signal is derived from the sync separating circuit 35. Therefore, the display signal is generated from the display generating circuit 51 on the basis of free-run outputs of the horizontal oscillating circuit 36 and vertical oscillating circuit 47. When the master picture plane is muted, consequently, even when the channel has been set to the channel having no signal, a disturbance of the display does not occur. By switching the video source selector switch 12 and displaying the signal to be displayed to the master picture plane onto the slave picture plane during the reception, the picture plane which is being received can be confirmed.

Figure 5:
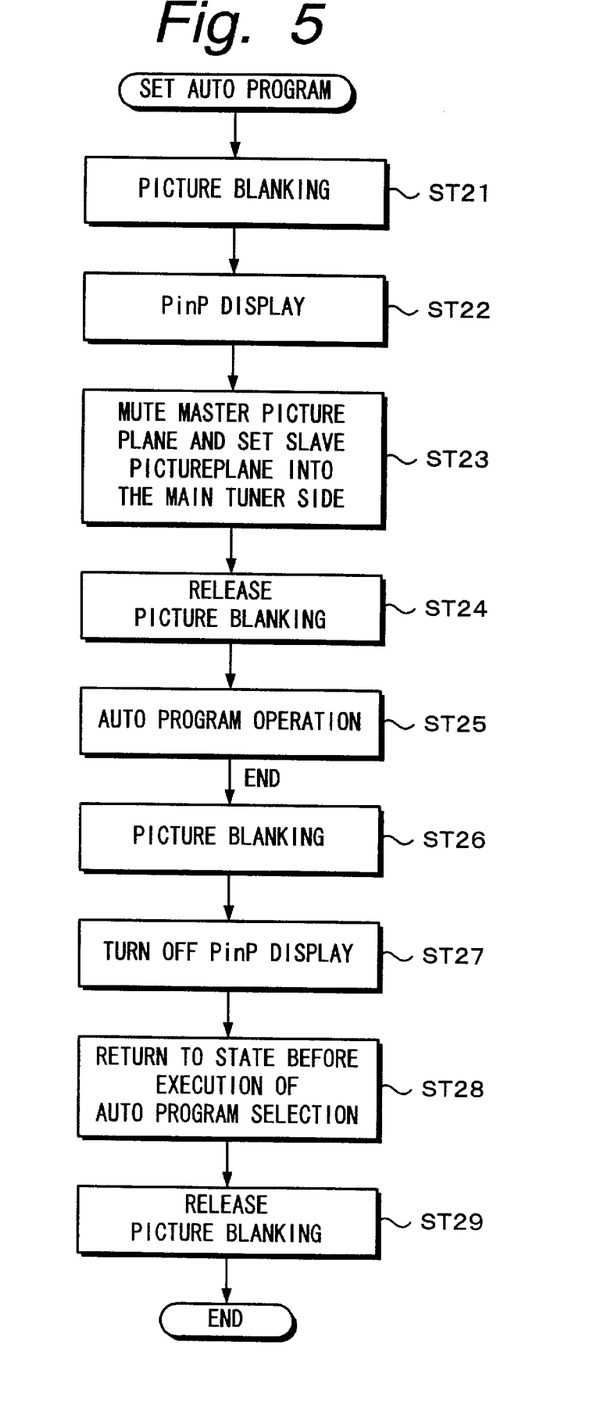
FIG. 5 is a flowchart which is used for explanation of the television receiver to which the invention is applied.

FIG. 5 is a flowchart showing the operation in case of executing the automatic programming process by using the picture plane of PinP as mentioned above. As shown in FIG. 5, when the automatic programming process is executed, the blanking of the picture plane is performed (step ST21) so that the disturbance of the picture plane when the screen is switched to the picture plane of PinP is inconspicuous and, after that, the slave picture plane is displayed by PinP (step ST22). The switching circuit 14 of the video source selector switch 12 is set to the terminal 14C side and the video image of the master picture plane is muted by the muting circuit 20 (step ST23).

When the switching circuit 14 of the video source selector switch 12 is set to the terminal 14C side, the video signal from the main tuner circuit 5 for the master picture plane is supplied to the Y/C separating circuit 22 to form the slave picture plane. The slave picture plane is formed from the video signal from the main tuner circuit 5 for the master picture plane. The blanking of the picture plane is released (step ST24). The automatic programming process as shown in the flowchart in FIG. 3 is executed (step ST25).

When the automatic programming process is finished, the blanking of the picture plane is performed (step ST26). The PinP display is turned off (step ST27). The receiver is returned to the ordinary receiving state, the switching circuit 14 of the video source selector switch 12 is set to the terminal 14A side, and the muting operation of the muting circuit 20 is released (step ST28). The blanking of the picture plane is released (step ST29).

FIG. 6 shows an example of a change in picture plane display when the master picture plane is muted, the picture plane which is being received is displayed to the slave picture plane by PinP, and the automatic programming process is executed.

Figure 6A:
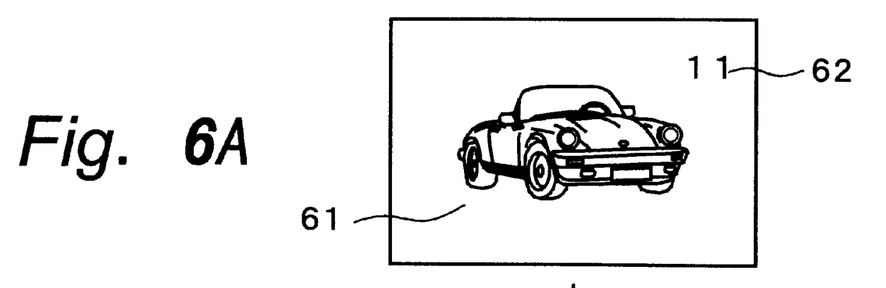
FIGS. 6A to 6D are schematic diagrams which are used for explanation of the television receiver to which the invention is applied.

FIG. 6A shows an ordinary reception picture plane. In the ordinary receiving state, the switching circuit 13 of the video source selector switch 12 is set to the terminal 13A side and the switching circuit 14 is set to the terminal 14A side. In this case, as shown in FIG. 6A, the image based on the channel set by the main tuner circuit 5 is displayed on a master picture plane 61. A display 62 of the set channel of the main tuner circuit 5 is displayed on the screen.

Figure 6B:
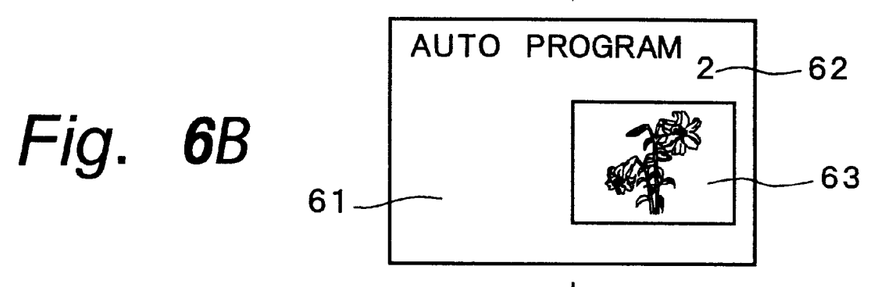

When the automatic programming process is executed, the switching circuit 14 of the video source selector switch 12 is set to the terminal 14C side and the video image of the master picture plane is muted by the muting circuit 20. Therefore, as shown in FIG. 6B, the display 62 such as a channel display or the like is displayed on the master picture plane 61 of the screen. The picture plane based on the video signal received by the main tuner circuit 5 is displayed on the slave picture plane 63 of PinP.

While the automatic programming process is executed, the channels of the main tuner circuit 5 are sequentially switched. Whether the reception signal is obtained or not is determined on each channel by an output of the signal detecting circuit 50. When the reception signal is derived, the channel at that time is stored in the memory 49.

Figure 6C:
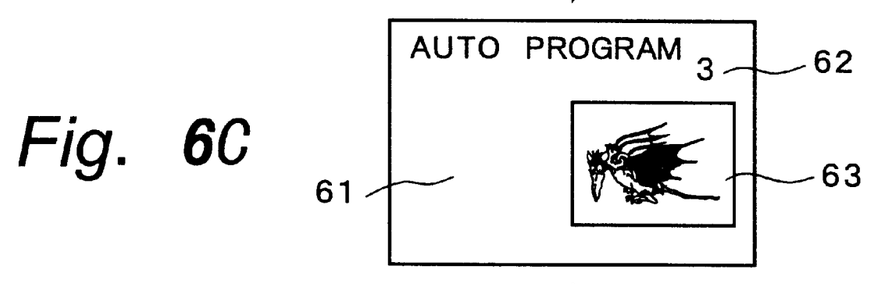

Therefore, while the automatic programming process is executed, as shown in FIGS. 6B and 6C, the display 62 corresponding to the channel at that time is displayed on the master picture plane 61 of the screen. The picture plane based on the video signal of the channel received by the main tuner circuit 5 is displayed on a slave picture plane 63 of PinP.

Figure 6D:
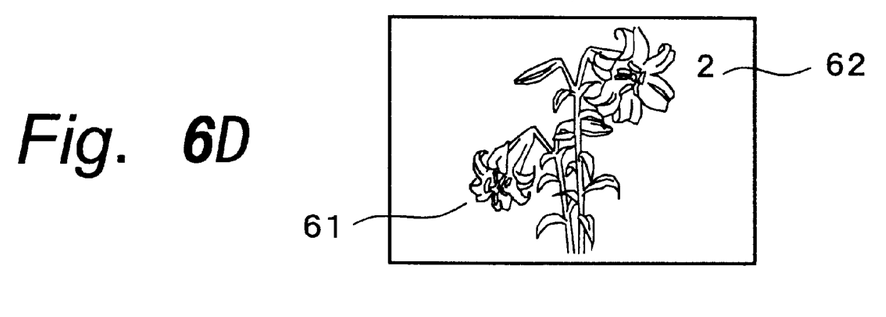

When the automatic programming process is finished, the receiver is returned to the ordinary receiving state. As shown in FIG. 6D, the channel is set to the minimum channel among the preset channels, the image based on this channel is displayed on the master picture plane 61, and this channel is displayed into the display 62 on the screen.

As mentioned above, in the television receiver to which the invention is applied, while the automatic programming process is executed, the video signal of the master picture plane is muted. Therefore, even while the channel has been set to the channel in which the video signal is not received, the display is not disturbed. While the automatic programming process is executed, the picture plane based on the video signal from the main tuner circuit 5 is displayed on the slave picture plane 63. Therefore, even during the execution of the automatic program, the picture plane which is being received can be watched.

Even in case of performing the channel erasing/adding process, the reception picture plane of the set channel is displayed by the slave picture plane in a manner similar to the case of the foregoing automatic programming process.

Figure 7:
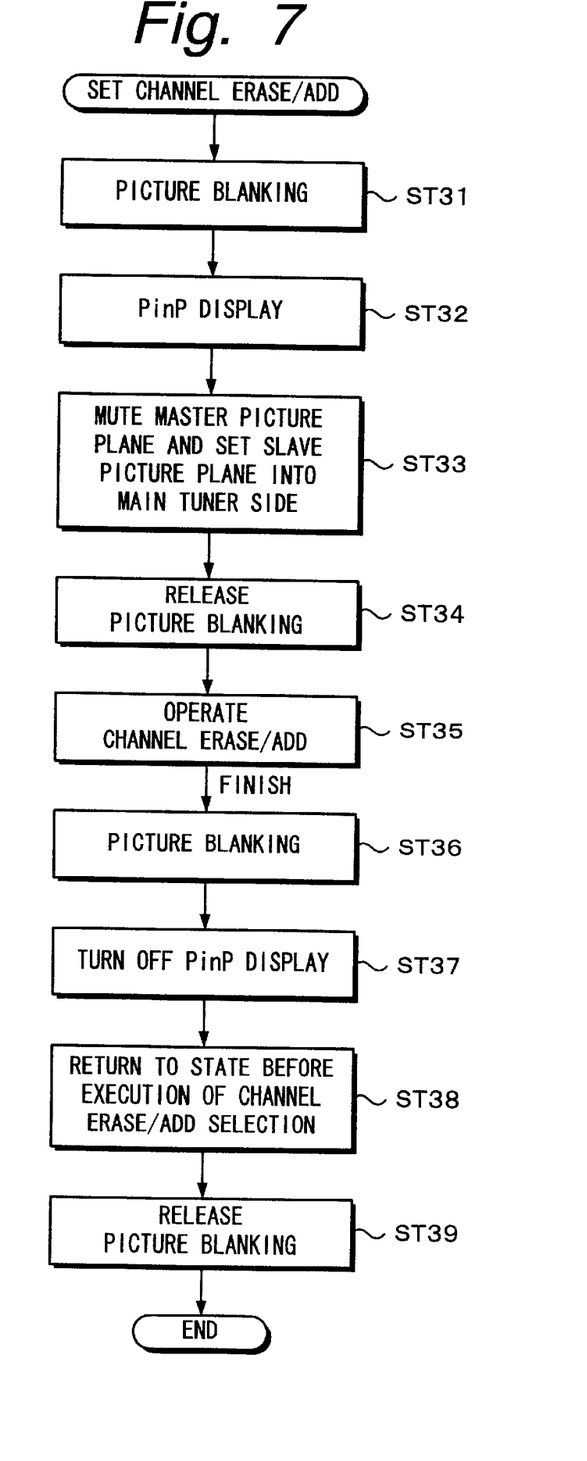
FIG. 7 is a flowchart which is used for explanation of the television receiver to which the invention is applied.

That is, as shown in a flowchart of FIG. 7, in case of setting the channel erasing/adding process, the blanking of the picture plane is performed (step ST31) and the screen is set to the display of PinP (step ST32).

The muting circuit 20 is set to the muting mode and the switching circuit 14 of the video source selector switch 12 is set to the terminal 14C side (step ST33). The blanking of the picture plane is released (step ST34). The channel erasing/adding operation as shown in FIG. 4 is executed (step ST35).

When the channel erasing/adding process is finished, the blanking of the picture plane is performed (step ST36). The PinP display is released (step ST37). The receiver is returned to the ordinary receiving state, the switching circuit 14 of the video source selector switch 12 is set to the terminal 14A side, and the muting operation of the muting circuit 20 is released (step ST38). The blanking of the picture plane is released (step ST39).

Figure 8A:
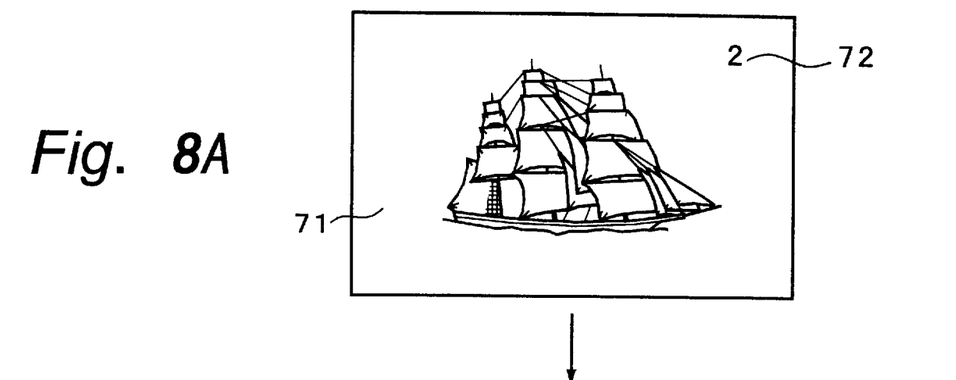
FIGS. 8A to 8C are schematic diagrams which are used for explanation of the television receiver to which the invention is applied.
Figure 8B:
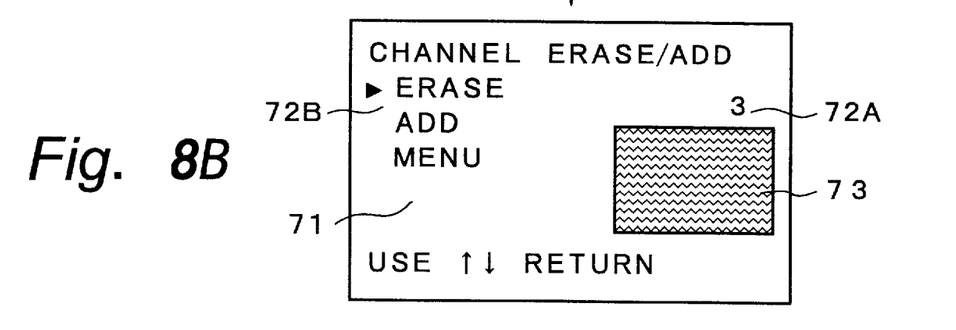
Figure 8C:
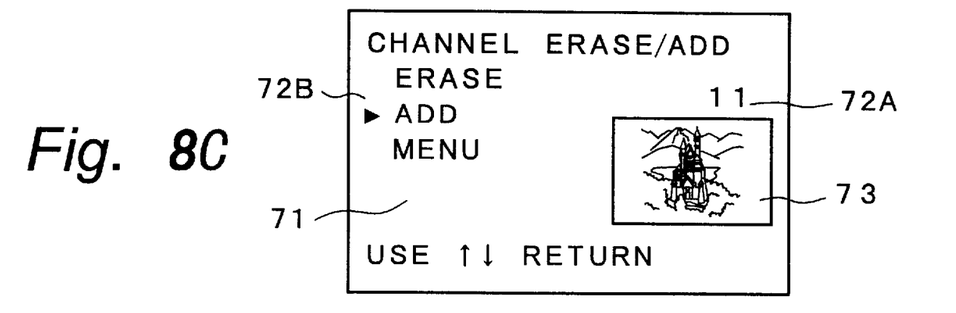

FIG. 8 shows an example of a change in picture plane display when the master picture plane is muted, the picture plane which is being received is displayed on the slave picture plane by PinP, and the channel erasing/adding process is performed.

In the ordinary receiving state, the switching circuit 13 of the source selector switch 12 is set to the terminal 13A side and the switching circuit 14 is set to the terminal 14A side. In this case, as shown in FIG. 8A, the image based on the channel which was set by the main tuner circuit 5 is displayed on a master picture plane 71 and a display 72 of the channel set by the main tuner circuit 5 is displayed on the screen.

When the operating mode is set to the channel erasing/adding process, the switching circuit 14 of the video source selector switch 12 is set to the terminal 14C side and the video image of the master picture plane is muted by the muting circuit 20.

In the channel erasing/adding process, as shown in FIG. 8B, a setting menu display 72B for erasure/addition is displayed. In case of erasing the channel, as shown in FIG. 8B, the user sets the operating mode to the channel erasure by the setting menu display 72B of erasure/addition and designates a channel to be erased by a channel key or an up/down key. When the channel is designated, this channel is displayed on a display 72A and the picture plane of this channel is displayed on a slave picture plane 73. When this process is executed, such a channel is erased.

In case of adding a channel, as shown in FIG. 8C, the user sets the operating mode to the channel addition by the setting menu display 72B of erasure/addition and designates a channel to be added by the channel key or up/down key. When the channel is designated, as shown in FIG. 8C, the display 72A of such a channel is displayed and the picture plane of this channel is displayed on the slave picture plane 73. When this process is executed, such a channel is added.

In the above example, the reception picture plane during the automatic program or channel adding/erasing process is displayed by one slave picture plane. However, it is also possible to more visually display by using a plurality of small picture planes.

That is, FIG. 9 shows a display example in case of performing the automatic programming process by using a plurality of picture planes. In case of the automatic programming process, as shown in FIG. 9A, when the execution of the automatic program is started, a master picture plane 81 is muted and the picture plane which is being received is displayed on a slave picture plane 82. When the receivable channels are searched by the automatic programming process, the picture plane at that time is fetched.

Figure 9A:
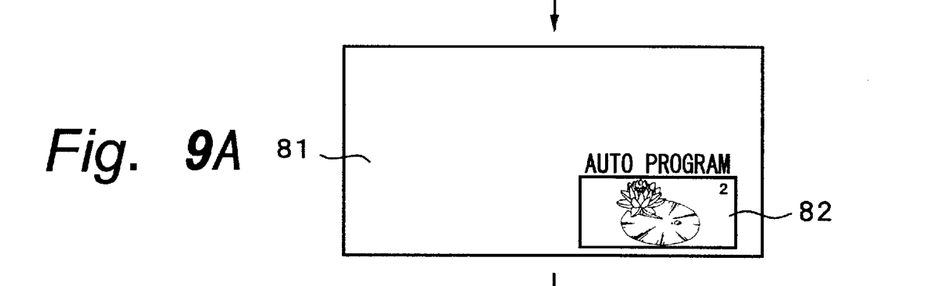
FIGS. 9A to 9D are schematic diagrams which are used for explanation of the television receiver to which the invention is applied.
Figure 9B:
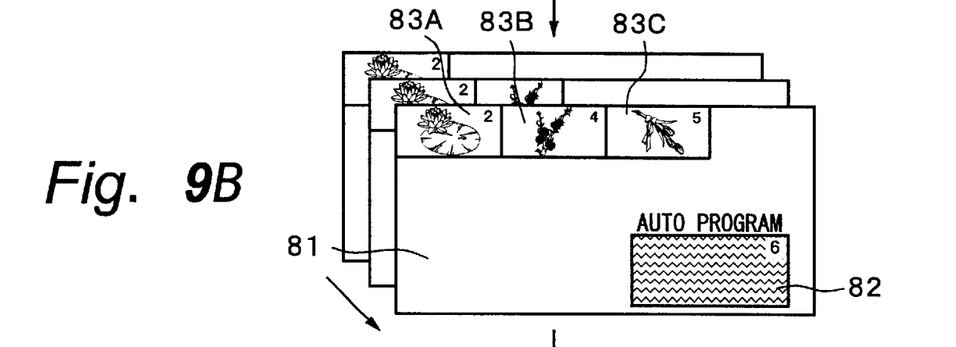

As shown in FIG. 9B, the picture planes of the receivable channels are sequentially displayed like small picture planes 83A, 83B, 83C, ...

Figure 9C:
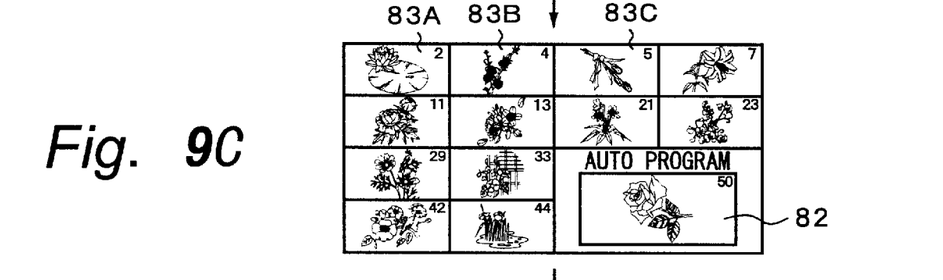
Figure 9D:
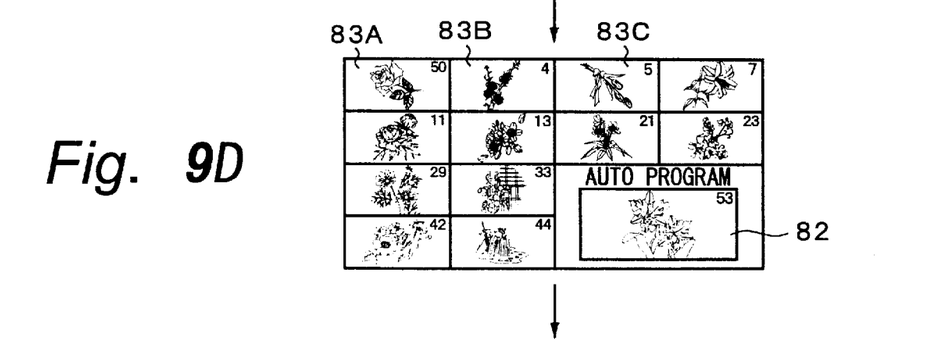

As shown in FIG. 9C, when the whole screen is filled with the small picture planes 83A, 83B, 83C, ... of the receivable channels, as shown in FIG. 9D, the next receivable channel is displayed while returning to the first small picture plane 83A.

Figure 10A:
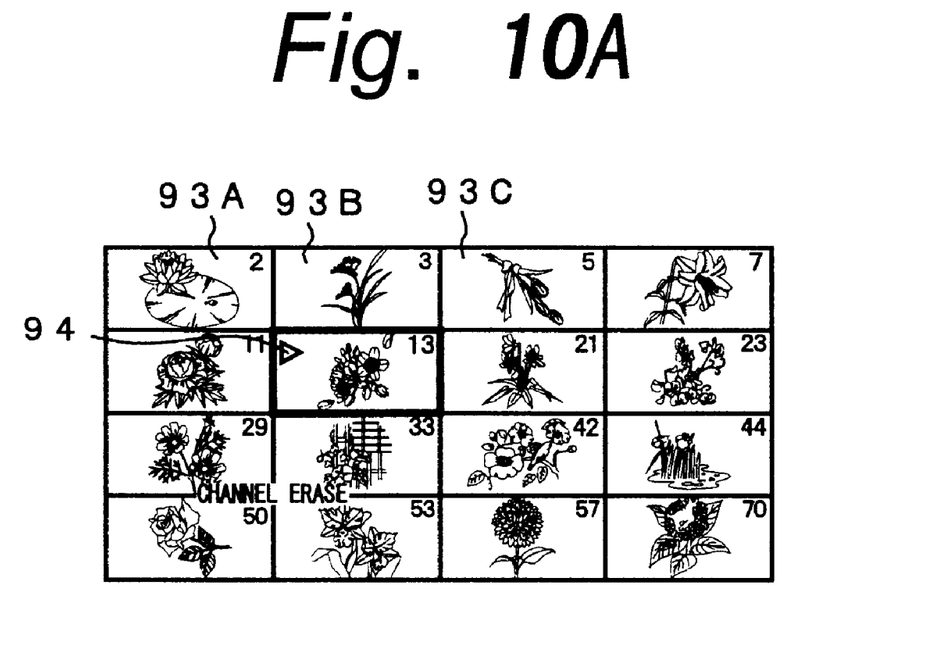
FIGS. 10A and 10B are schematic diagrams which are used for explanation of the television receiver to which the invention is applied.
Figure 10B:
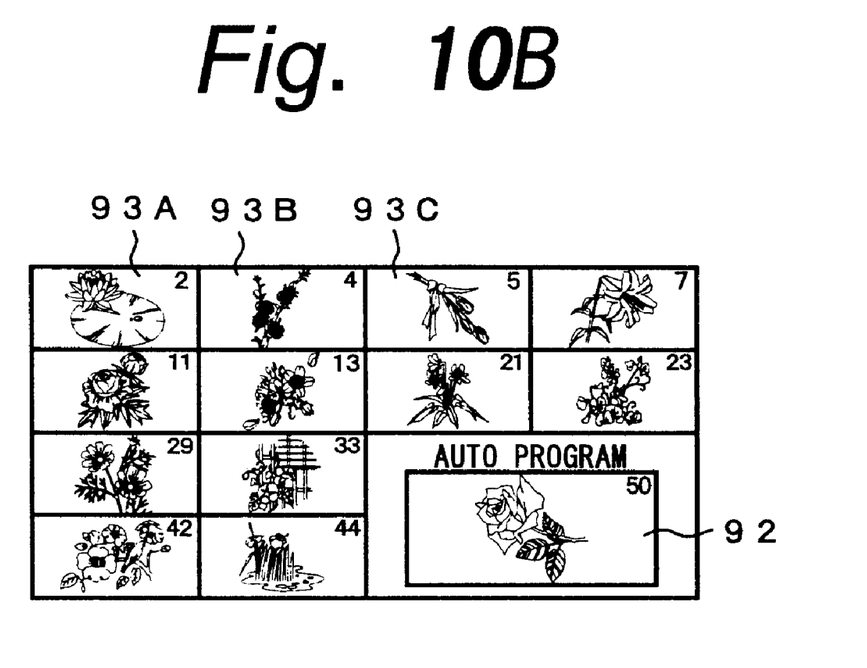

FIG. 10 shows a display example when the channel erasure/addition is performed by using a plurality of picture planes. In case of erasing the channel, as shown in FIG. 10A, a list of the preset channels is displayed by small picture planes 93A, 93B, 93C, ... In case of erasing the channel, the user selects the channel to be erased by a pointer 94. When the channel to be erased is selected and the process is executed, the channel corresponding to the small picture plane designated by the pointer 94 is erased.

As shown in FIG. 10B, in case of adding the channel, a list of the preset channels is displayed by the small picture planes 93A, 93B, 93C, ... When the user wants to add the channel, the user receives the channel to be added. When the channel to be added is received, the reception picture plane of the channel is displayed by a slave picture plane 92. When the process is executed, this channel is added.

In the above example, although a circuit for counting the number of horizontal sync signals and discriminating the presence or absence of the signal has been used as a signal detecting circuit 50, it is also possible to merely detect the signal level and to discriminate the presence or absence of the signal.

In the above example, in case of executing the automatic programming process, the channels are sequentially scanned so as to raise the channel from the channel number 1. However, the channel scanning order is not limited to it.

According to the invention, when the automatic programming process for searching the receivable channels and presetting the receivable channels is executed, the video signal of the master picture plane is muted and the picture plane of the reception channel is displayed on the slave picture plane. When the automatic programming process is executed, since the video signal of the master picture plane is muted, the sync signal is not disturbed and the display is stabilized. Even during the execution of the automatic program, the video image of the channel which is being received can be confirmed by the slave picture plane.

According to the invention, when the channel erasing/adding programming process to add or erase the channel is performed, the video signal of the master picture plane is muted and the picture plane of the reception channel is displayed on the slave picture plane. Therefore, during the channel erasing/adding programming process, the display is stabilized. Even during the execution of the channel erasing/adding program, the video image of the channel which is being received can be confirmed by the slave picture plane.

Industrial Applicability

As mentioned above, the television receiver, method of setting the reception channel, and image display method according to the invention are useful in case of executing the automatic programming process for automatically setting the receivable channel among the multi-channels such as CATV or satellite broadcasting or the channel erasing/adding process for adding or erasing the channel.

What is claimed is:

1. A television receiver which can preset a channel which can be received, having:

detecting means for detecting whether a video signal can be obtained in the reception channel selected by said reception channel selecting means or not and outputting a detection result; and     reception channel storing means in which said reception channel is stored; control means for allowing said reception channel selecting means to sequentially scan a plurality of reception channels and allowing receivable reception channels to be stored in said reception channel storing means on the basis of said detection result in each reception channel, characterized in that said television receiver comprises:
  image display means for displaying an image corresponding to a video signal onto a screen;
  video signal processing means for displaying at least two video images onto said screen on the basis of at least a first video signal corresponding to the channel selected by said reception channel selecting means and a certain second video signal;
  switching means for switching the second video signal to be displayed into a second portion on said screen to the first video signal to be displayed into a first portion on said screen and displaying an image based on said first video signal into the second portion on said screen,
  said switching means is switched when at least the receivable channel is preset, thereby allowing the image based on said first video signal to be displayed into the second portion on said screen;
  muting picture plane forming means for displaying a muting picture plane into said first portion, and
  the muting picture plane is displayed into said first portion during said presetting of said television receiver.

2. A television receiver according to claim 1, characterized in that
  said television receiver further has second reception channel selecting means, and
  said certain second video signal is a video signal of a station selected by said second reception channel selecting means.

3. A television receiver according to claim 1, characterized in that
  said television receiver further has input means for inputting a video signal from an outside, and
  said certain second video signal is a video signal from said input means.

4. A television receiver according to claim 2, characterized in that
  said television receiver further has display signal forming means for forming a display signal to display various information onto the screen, and
  the video image based on said display signal is displayed into said first portion during said presetting of said television receiver.

5. A television receiver having:
  reception channel tuning means for tuning a reception channel;
  input means for inputting a desired reception channel to be tuned; and
  control means for allowing said reception channel tuning means to tune the reception channel on the basis of the reception channel inputted by said input means,
  characterized in that said television receiver comprises:
  image display means for displaying an image corresponding to a video signal onto a screen;
  video signal processing means for displaying a video signal corresponding to the channel tuned by said reception channel tuning means onto said screen;
  display signal forming means for forming a display signal to display various information onto said screen and displaying an image corresponding to said display signal onto said screen;
  signal oscillating means for generating a signal at a predetermined frequency;
  sync signal extracting means for extracting a sync signal from said video signal;
  internal sync signal forming means for forming an internal sync signal on the basis of said sync signal and said signal oscillating means and supplying to said display signal forming means; and
  muting means for shutting off said video signal in order to form a muting picture plane onto said screen, and
  when said video signal is shut off by said muting means, said internal sync signal forming means is allowed to form the internal sync signal on the basis of said signal oscillating means, and the image corresponding to said display signal is displayed onto said screen by said display signal forming means on the basis of said sync signal.

6. An image display method of displaying an image corresponding to a display signal into a television receiver, having:
  an input step of inputting a desired reception channel to be tuned;
  a reception channel tuning step of tuning said desired reception channel by tuning means; and
  a display signal forming step of forming a display signal to display various information onto said screen, thereby displaying an image corresponding to said display signal onto said screen,
  characterized by comprising:
  an image display step of displaying an image corresponding to the video signal tuned by said tuning means onto the screen;
  a signal oscillating step of generating a signal at a predetermined frequency;
  a sync signal extracting step of extracting a sync signal from said video signal;
  an internal sync signal forming step of forming an internal sync signal on the basis of said sync signal and said signal oscillating step;
  a muting step of shutting off said video signal in order to form a muting picture plane onto said screen; and
  a step of allowing the internal sync signal to be formed on the basis of said signal by said signal oscillating step when said video signal is shut off by said muting step, thereby displaying the image corresponding to said display signal onto said screen on the basis of said sync signal.

* * * * *